United States Patent [19]

Corke et al.

[11] Patent Number: 5,058,983
[45] Date of Patent: Oct. 22, 1991

[54] FIBER OPTIC CONNECTOR TERMINATOR

[75] Inventors: Michael C. Corke, Mendon; Frederick J. Gillham, Westboro; Andong Hu, Whitinsville; Wayne Moore, Marlboro, all of Mass.

[73] Assignee: Aster Corporation, Milford, Mass.

[21] Appl. No.: 549,377

[22] Filed: Jul. 6, 1990

[51] Int. Cl.$^5$ .............................................. G02B 6/36
[52] U.S. Cl. .................................................... 385/78
[58] Field of Search ............... 350/96.15, 96.20, 96.21, 350/96.22, 96.23

[56] References Cited

U.S. PATENT DOCUMENTS

| | | | |
|---|---|---|---|
| 4,637,682 | 1/1987 | Mahlein et al. | 350/96.15 |
| 4,695,126 | 9/1987 | Cook | 350/96.15 X |
| 4,708,423 | 11/1987 | Erman et al. | 350/96.15 |
| 4,887,875 | 12/1989 | Chang et al. | 350/96.21 |
| 4,892,378 | 1/1990 | Zajac et al. | 350/96.20 |
| 4,930,856 | 6/1990 | Pelta | 350/96.20 |
| 4,941,727 | 7/1990 | Maranto et al. | 350/96.21 X |
| 4,953,941 | 9/1990 | Takahaski | 350/96.20 |

Primary Examiner—William L. Sikes
Assistant Examiner—Phan T. Heartney
Attorney, Agent, or Firm—Fish & Richardson

[57] ABSTRACT

A terminator for use with an optical fiber access port structure that supports an optical fiber having an optical end face exposed to communicate with a like end face of another fiber, the terminator comprising a pig-tail-free compact supporting body carrying within itself light-absorbing means and shaped to removably interfit with the access port structure to present the light-absorbing means in light transferring relationship to the exposed end of said optical fiber at the port in manner to absorb incident light from the fiber end face and prevent back-reflection.

14 Claims, 4 Drawing Sheets

FIBER OPTIC CONNECTOR TERMINATOR

FIELD OF THE INVENTION

The invention relates to terminating unused access ports of fiber optic systems.

BACKGROUND OF THE INVENTION

Optical fibers are commonly used in place of copper conductors to distribute signals. Applications include video distribution systems, data and voice communications, and sensor signal networks. Both multimode and single mode optical fiber systems are employed for such purposes. Conceptually, the distribution of optical power for any purpose requires that a source or combination of sources of optical power be divided among a number of accessible fiber optic connection points called ports. Each port serves as a separate source from which optical power may be fed into a separate optical fiber. Each fiber connected to a port may lead to a remote location for connection to user equipment. Generally, the source of optical power is modulated with information to be distributed among users.

Optical fiber systems obey essentially the same limitations as any communication medium in regard to the relationship between channel data capacity and signal to noise ratio. In any system there is an upper limit to the amount of optical power available, and there is noise. The lower the ratio between signal power and noise, the lower the channel capacity. In addition to the noise introduced by the electronic elements of the system, e.g., optical receiver amplifier noise, there may be optical noise. Among the common optical noise sources, optical power reflection is of considerable concern.

Optical power reflection occurs at any point in a fiber optic system where there is a discontinuity in the optical medium. Moreover, light traveling in an optical fiber reflects from the end of the optical fiber and travels back toward the source. Optical power reflected in this manner may reflect again when it arrives at the source point or other points in the system adding an unwanted noise component to the source signal. Optical power that is reflected back into a source can also corrupt the fundamental operation of the source. Lasers, e.g., are susceptible to unwanted optical power traveling back into the lasing cavity and often generate spurious optical signals as a result. To prevent back reflection, the end of an optical fiber, e.g., the end accessible at an unused port, must be terminated properly.

Another concern relates to the radiation of optical power from unused optical ports. As optical power sources become more powerful, there is an increasing risk of eye damage to personnel exposed to the open outputs of unused ports.

There may be hundreds of such ports co-located on distribution panels. On the other hand, fiber cables may run from a central distribution point to user access ports mounted, e.g., in a receptacle on the wall of the user's office. The connectors used as ports are usually expensive and subject to failure if exposed to abuse or dirt. Unused optical ports must, therefore, be protected from inadvertent exposure to contamination, contact with tools, etc.

To prevent back-reflections or hazardous radiation from unused ports, according to prior methods, a mating connector was fitted with a length of optical fiber, often called a pigtail, that extended outwardly from the connector. That pigtail fiber was terminated with a means that absorbed optical power. Thus, when the terminated pigtail fiber was connected to the unused port, optical power was passed through the mating connector into an absorptive means via the pigtail and was neither back-reflected nor radiated into the user's environment. The presence of the terminating connector also protected the port connector from damage.

While this means of terminating unused ports satisfies the basic requirements, the terminated pigtail fiber itself is subject to breakage. The pigtail fiber may be broken inside several layers of jacketing materials with no external indication of the flaw. The flaw reflects light back into the system with the potential of creating problems. Such flaws can be very difficult to locate. Additionally, a distribution panel may become cluttered with pigtails impairing the ability to identify unused ports.

Prior means of terminating the pigtail fiber consist of preparing the terminate end of the fiber so that it does not back-reflect light. Typically, to ensure minimum back-reflection from the end of an optical fiber it has been taught that the fiber end should be polished at angle relative to the longitudinal axis of the fiber. An angle sufficient that light travelling parallel to the axis of the fiber is internally reflected back into the fiber at an angle beyond the internal critical angle of the fiber ensures that any back-reflections are attenuated. Polishing is a time consuming operation adding considerable cost to the fabrication of terminating means.

Alternatively, it has also been suggested that crushing the end of the fiber in combination with a coating of light absorbing material applied to the crushed end is a sufficient means to satisfactorily eliminate back-reflected light. Repeated experimentation in an actual manufacturing environment has proven this prior teaching to be inaccurate. Merely crushing the end of a fiber and coating it with an appropriate material yields widely varying back-reflection levels. Moreover, the results obtained by simply crushing the end of the fiber and coating it with a composite material are not reliable nor repeatable enough for a manufacturing process.

Considering these several weaknesses of prior connector terminating means, a better approach is desirable.

SUMMARY OF THE INVENTION

One aspect of the invention is a terminator, for use with an optical fiber access port structure that supports an optical fiber having an optical end face exposed to communicate with a like end face of another fiber the terminator comprising a pig-tail-free compact supporting body carrying within itself light-absorbing means and shaped to removably interfit with the access port structure to present the light-absorbing means in light transferring relationship to the exposed end of the optical fiber at the port in manner to absorb incident light from the fiber end face and prevent back-reflection.

Preferred embodiments of this aspect of the invention have one or more of the following features.

The terminator has a ferrule-shaped end constructed to enter one end of an alignment sleeve in end-on relationship with the end face of the optical fiber of the access port that is also held by its respective ferrule within the alignment sleeve.

The terminator comprises a protective housing and confined entirely within the housing is a short segment of optical fiber having an input end face exposed for light-transfer relationship with the end face of the fiber of the access port, and a light-absorptive medium, confined within the housing is associated with the other, terminated, end of the short segment of fiber to absorb light from the short segment of fiber and prevent back-reflection.

The terminator includes deformable light absorbing material carried by the supporting body in manner to expose it for direct contact with the optical end face of the optical fiber of the access port.

The terminator for interfitting with an access port comprised of an end ferrule surrounding the optical fiber, comprises a protective member having a bore constructed to slide endwise over the ferrule in interfitting relationship, and deformable light-absorbing material closing the end of the bore having a face exposed to deformably engage the end of the fiber to absorb incident light and prevent back reflection.

One particular aspect of the invention features elements contained within a small mechanical package which may appear similar to an appropriate mating port connector. Inside the mechanical package of the terminator is a short length of optical fiber which ends in an optically absorptive terminating material. The short length of fiber is mounted in a fiber-alignment ferrule dimensionally compatible with a mating port connector. The ferrule serves to accurately align the core of the short fiber section within the terminator to the core of the accessed fiber in the unused port connector. The terminator may or may not be fitted with a mechanical means such as a threaded shell to mechanically fix the terminator in the port connector.

In use, the terminator is inserted into an unused optical port. Optical power arriving at the unused port passes into the short fiber as it normally would if a fiber optic cable were connected to the port in place of the terminator. The optical power travels a very short distance, nominally less than a centimeter, in the short fiber and reaches the terminated end where it is absorbed.

The absorptive end termination in this embodiment comprises a small amount of polymer material with refractive index chosen to prevent reflection from the terminated end of the short fiber. Further, the terminated end of the short fiber is cleaved at an angle relative to the longitudinal axis of the fiber, that angle being sufficient to obtain repeatable low back-reflection levels.

Another embodiment of the invention uses a relatively soft optical polymer to terminate the unused port. Again the mechanical assembly of the invention closely resembles a typical fiber optic connector. In this embodiment, however, there is no short length of optical fiber inside the mechanical shell of the terminator. Instead, a relatively large diameter insert of soft polymer is located so that, upon insertion of the terminator into an unused port connector, the polymer is brought into contact with the end of the optical fiber accessed at the port. By proper choice of polymer refractive index, reflections between the accessed fiber end and the polymer surface interface are essentially eliminated. Optical power is totally conducted into the polymer insert where it is absorbed.

The polymer insert is formed by, e.g., injecting a castable resin into a recess in the terminator body. The recess may be shaped to prevent light from reflecting back into the accessed fiber. Further, the recess may be coated prior to polymer injection with an absorptive or diffusing layer further reducing the possibility of back-reflection. Since the polymer insert has large diameter relative to the accessed fiber core, alignment of the polymer with the accessed fiber is not critical. This eliminates the need for a fiber alignment ferrule in the terminator assembly and, since no optical fiber is present within the terminator of this embodiment, many manufacturing assembly steps are eliminated. A terminator shell of this embodiment can be made by conventional injection molding techniques, reducing the volume manufacturing cost from several dollars to a few cents per termination.

Advantageously, the invention in either embodiment eliminates the use of a terminated pigtail fiber. The terminating means is totally self-contained in a small, rugged mechanical package. Both embodiments provide clutter-free terminations which are immune to pigtail fiber breakage.

The invention contains the necessary elements and is properly sized to mate with a port connector. Different styles and sizes of port connectors may require embodiments of the invention to have different mechanical details. In scope, each embodiment of the invention is extendable to any style, size, type, series, or gender of access port connector and to multi-fiber connectors.

These features and advantages will become more clear in the following detailed discussion of the preferred embodiments and the Figures.

PREFERRED EMBODIMENTS

Figure 1:
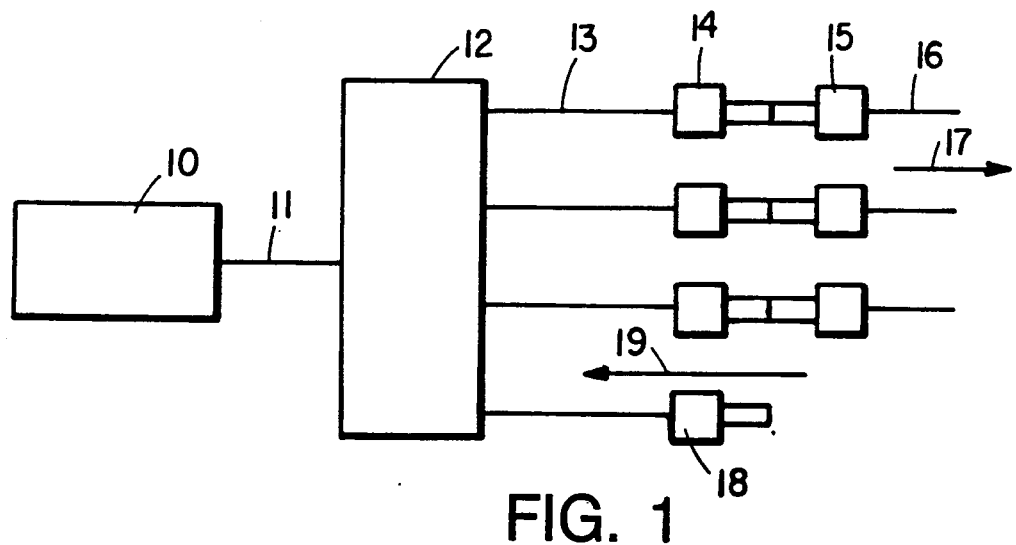
FIG. 1 is a schematic illustration of a fiber optic video distribution system showing both connected and unterminated fiber optic port connectors.

FIG. 1 schematically illustrates a simple fiber optic video signal distribution system as an example of a system in which the invention might find use. An optical power transmitter 10 is connected to a passive power divider 12 via an optical fiber 11. The passive divider 12 splits the source signal into four outputs and feeds it via optical fibers indicated collectively by the numeral 13 to access ports indicated collectively by 14. Access ports 14 are connected via a collection of mating connectors 15 and fiber optic cables 16 to users (not shown). The signal, represented by the arrow 17 travels away from the source toward the user on each of fiber optic cables 16.

Access port 18 is unused. The signal is reflected from the unterminated port 18 back toward the transmitter 10 as represented by the arrow 19. This back-reflected signal may reflect again from points within the passive divider 12. If so this re-reflected signal combines with the original signal and corrupts the original waveform at some of the other access ports 14. The back-reflected signal 19 may also return to the source 10 and ultimately create noise on all the access ports.

In an actual system, the passive divider 12 splits the transmitted signal into a multiplicity of ports, any number of which may be unused and, if not properly terminated, contribute noise to the system. Similarly, any fiber optic cable, e.g., any of the cables denoted 16 in FIG. 1, may be unterminated at the user's end (not shown) creating essentially the same undesirable effect.

The embodiments of the invention mate with access port connectors like those indicated as 14 and 18 in FIG. 1 to provide non-reflective termination. While use with all present and future types and styles of port connectors is anticipated by the invention, this disclosure shall illustrate the invention as it might be embodied for compatibility with one style of fiber optic connector. This is not intended to imply limitation of the invention to the illustrative example chosen.

Figure 2:
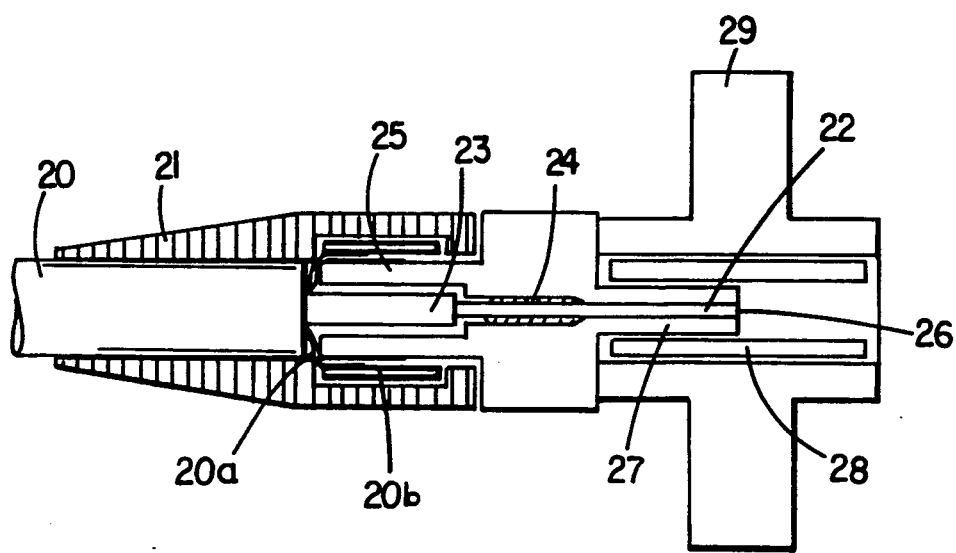
FIG. 2 is detailed sectional side view of a typical fiber optic port connector, connector adaptor, and alignment sleeve as they might appear before termination.

FIG. 2 illustrates a typical fiber optic connector. A fiber optic cable 20 carrying optical power enters a flexible boot 21. The cable is secured to the connector body 25 using a strength member 20a, e.g., a flexible strand of the cable, and crimp ring 20b. The optical fiber 22 is stripped free of its jacketing material 23 and held with adhesive 24 such as epoxy in the connector body 25. The accessible end 26 of the fiber 22 is located in a ferrule 27, an extension of connector body 25, to ensure accurate alignment with a mating fiber not shown. The ferrule 27 fits in an alignment sleeve 28 which is located in a connector adaptor 29. The connector adaptor may be mounted to a panel (not shown), e.g., a sheet metal member supporting many such adaptors, or the adaptor, or the adaptor may be an in-line component. The connector body 25 typically has some mechanical means (not shown) to hold the connector body 25 and adaptor 29 together. The accessible end 26 of the fiber 22 is unterminated as shown in FIG. 2.

Figure 3:
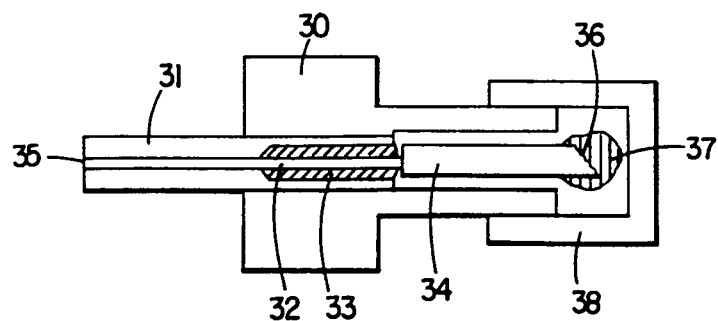
FIG. 3 is a detailed sectional side view of a preferred embodiment of a connector terminator according to the invention.

In a preferred embodiment shown in FIG. 3, several elements of the connector shown in FIG. 2 are duplicated. A terminator body 30 holds a ferrule 31. Typically the ferrule 31 is of the same type commercially available and used e.g., in a connector of the type illustrated in FIG. 2. A short length of optical fiber 32 is held by adhesive 3 in the ferrule 31. The jacketing material 34 may or may not be removed from the fiber 32. The input end 35 of the terminator is prepared as will be discussed herein to provide minimum reflection when mated with a connector as shown in FIG. 2. The terminated end 36 of the short fiber 32 is coated with a material 37 having refractive index closely matched to the short fiber. A protective cap 38 covers the terminated end of the assembly, so that the optical fiber is entirely contained within the protective shell of the terminator.

The invention features a novel approach to the preparation of the terminated end of the short terminating fiber. It has been found, according to the invention, that compression, edge cleaving, e.g., by use of a simple tool such as wire cutters sometimes known as dikes, can be made repeatable and highly effective. To do so, the fiber must be cleaved at an angle less than 90 angular degrees relative to its longitudinal axis. In the context of prior teachings, crushing has implied an uncontrolled operation. By comparison, the compression, edge cleaving of the invention requires that the edge of the cleaving tool always extend fully across the fiber and meet the fiber at an angle less than 90 degrees relative to the longitudinal axis of the fiber. The cleaving angle 43 shown in FIG. 4 is measured relative to the perpendicular indicated by the line 45 drawn normal to the fiber axis.

Figure 4:
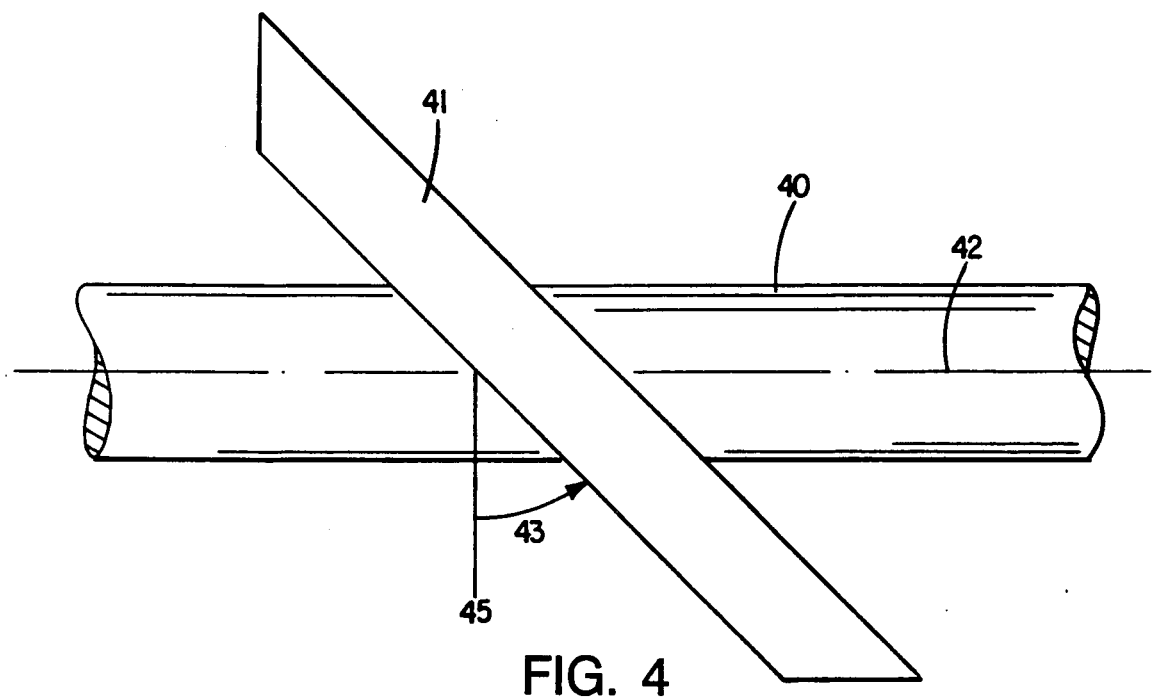
FIG. 4 is a schematic illustration showing the geometry of the angle cleaving means as it relates to the data of FIG. 5.

FIG. 4 is a schematic top view of the angled edge cleaving means of the invention. An optical fiber 40 is placed at an angle relative to the edge of the cleaving blade 41. The angle between the normal to the fiber axis 45 and the edge 41 is denoted by the arrow 43. When pressure is applied to the edge 41 the fiber 40 fractures, generally along a single plane corresponding to the alignment of edge 41.

Figure 5A:
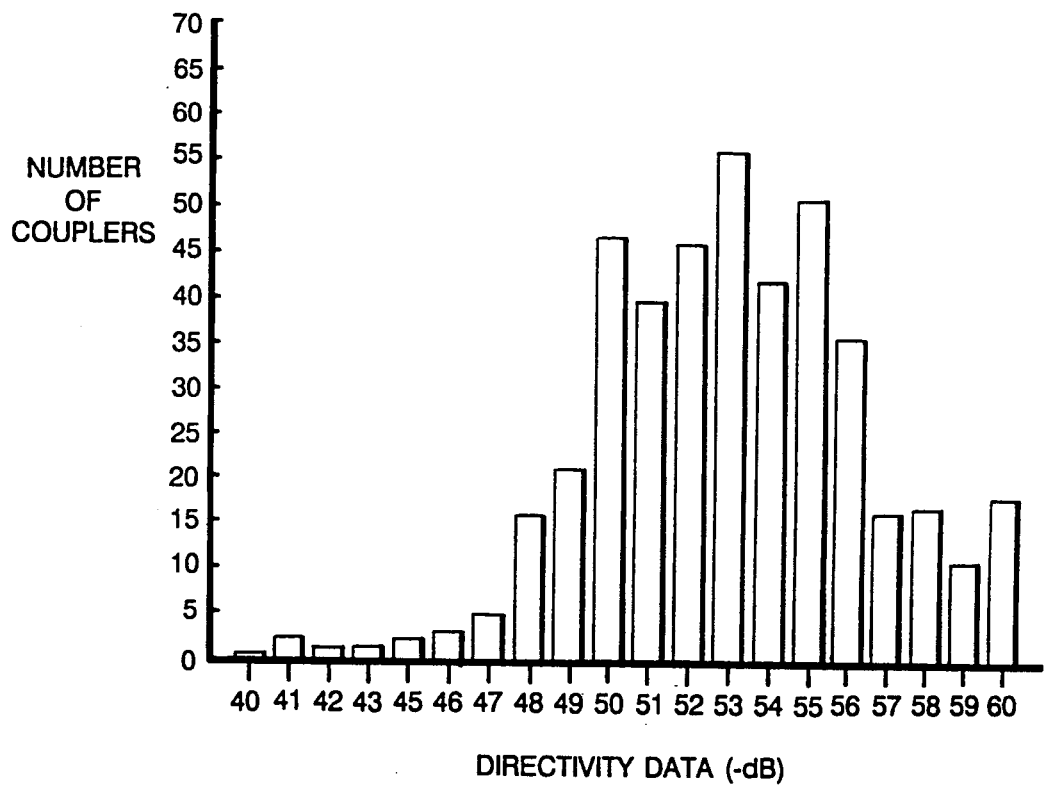
FIG. 5a) is a histogram of data showing the of back-reflection performance for straight crushed fiber ends; b) is a histogram of data showing the back-reflection performance of angle crushed fiber ends according to the invention.

FIGS. 5a and b are data taken from two cases of fiber end cleaving angle. Relative back-reflection power in db is indicated on the horizontal axis, versus number of trials of edge cleaving on the vertical axis for the two cases of:

a) Straight cleaving, wherein the cleaving edges lie essentially perpendicular to the fiber longitudinal axis, e.g., cleaving angle is essentially zero degrees; and b) edge cleaving according to the invention wherein the edges lie at an angle greater than the fiber critical angle, e.g., for angles greater than 5 angular degrees.

Figure 5B:
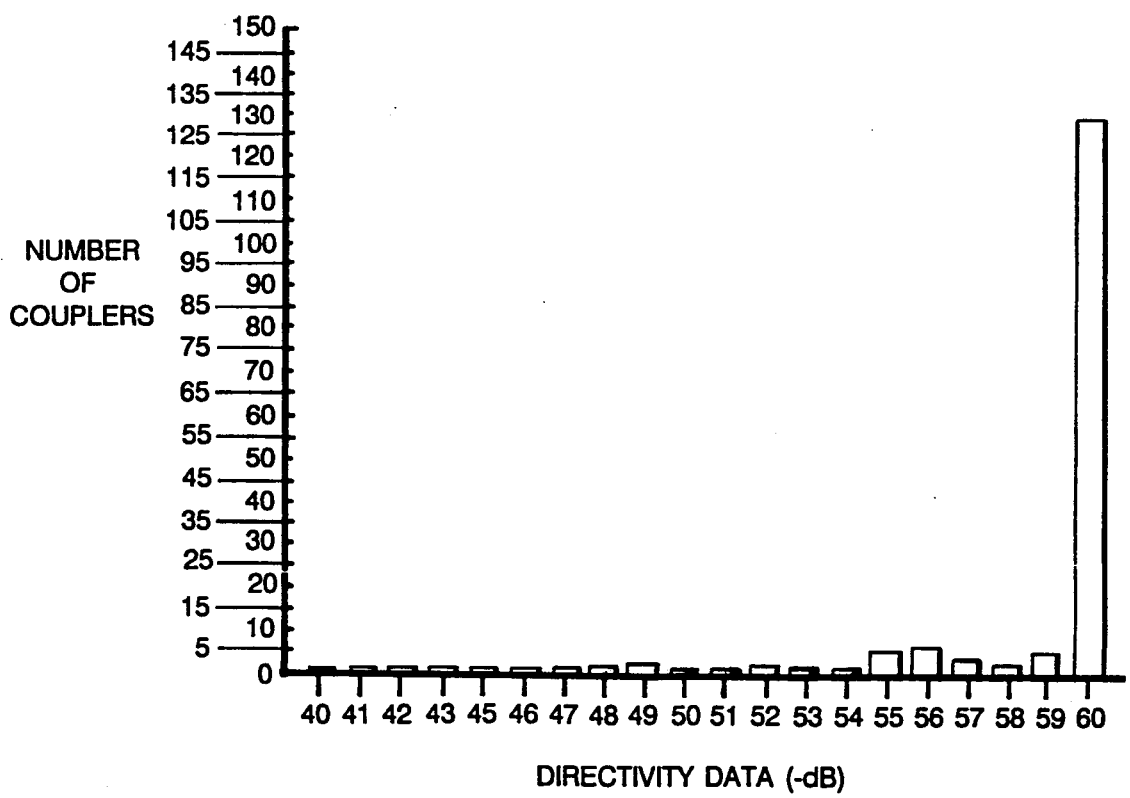

Notably in FIG. 5b, nearly 100% of the trials using the angled edge cleaving method of the invention result in superior back-reflection levels of at least −60 db. This data was taken with an instrument capable of measuring optical power levels no less than −60 db. Therefore the minimum average back-reflection level using angled edge cleaving is at most −60 db. In comparison, FIG. 5a shows that the average back-reflection level using straight cleaving is only about −52 db. The dramatic increase in terminator performance using angled edge cleaving is accompanied by a yield of essentially 100% in the manufacturing environment, significant improvements over prior teachings.

Advantageously edge cleaving of the fiber end at an angle according to the invention is much simpler than polishing the fiber end to a precise angle.

Figure 6A:
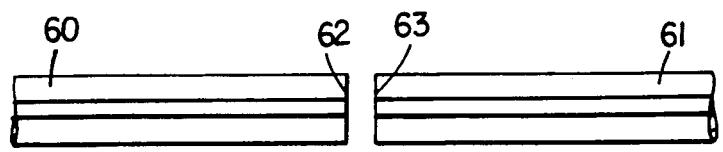
FIGS. 6a–6d are schematic illustration of four methods used to prepare the ends of optical fibers for connection.

In order for the terminator to be effective, optical power must be coupled from the port fiber into the terminator without reflections from the interface between the end of the port fiber and the input end of the terminating fiber. FIG. 6 illustrates four common end surface profiles used for butt connecting fibers. FIG. 6 shows four side views of two fibers 60, 61 held in axial alignment by means not shown. In FIG. 6a the end faces 62, 63 of both fibers are polished flat. Typically this method of preparing fibers results in poor back-reflection performance, e.g., back-reflection in the range of 4.0 percent of the incident power is common.

Figure 6B:
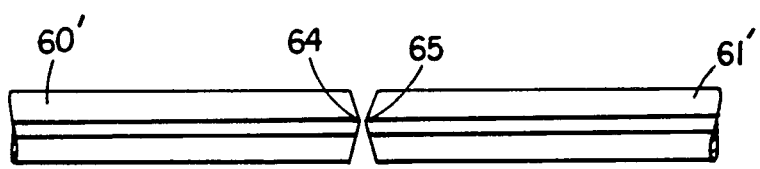

FIGS. 6b, c, and d all show end preparation methods which ensure good back-reflection performance in the range of less than 0.0032 percent (−45 db) of the incident power. FIG. 6b illustrates fibers 60 and 61 with ends 64, 65 polished at angles. This angle-polished method requires that connectors be keyed to align the fibers rotationally about their axis for optimum performance. Hence a terminator of the first embodiment matched to angle polished fibers includes rotational alignment means, such as formations of the ferrules with a matching keyway in the alignment sleeve 28.

Figure 6C:
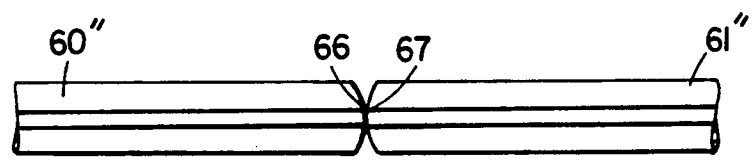

FIG. 6c illustrates fibers 60, 61 with ends 66, 67 polished to form convex surfaces. Convex polishing is rotationally symmetrical so no key is required in the connector and terminator. The polishing means is somewhat complex in either the angle-polished or convex-polished approaches requiring special tooling and additional manufacturing steps. In all of the end preparation methods shown in FIGS. 6a, b, and c, the final spacing between the ends of the fibers is critical. Best performance is obtained with the flat-polished and convex polished methods when the fibers are made to contact. The angle-polished ends should be prevented from making contact. These considerations require precise control of mechanical tolerances related to fiber-to-fiber end-gap spacing.

Figure 6D:
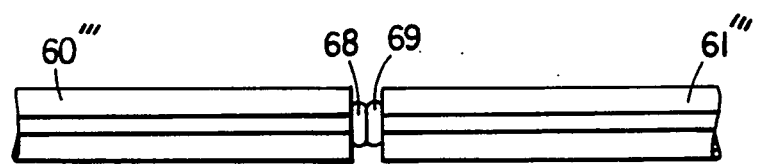

FIG. 6d illustrates two fibers 60, 61 flat-polished and connected via refractive index matching elastomeric slabs. Thin slabs of soft elastomer 68, 69, which might have refractive index in the range of plus or minus one percent of the fiber core refractive index, are placed between the ends of fibers. Since the elastomer is compliant, the mechanical tolerances related to fiber-to-fiber end-gap are somewhat relaxed in this method. Specific terminators constructed according to FIG. 3 are constructed to mate with a selected fiber type as shown in FIGS. 6a-d by incorporating fiber with a like end.

Figure 7:
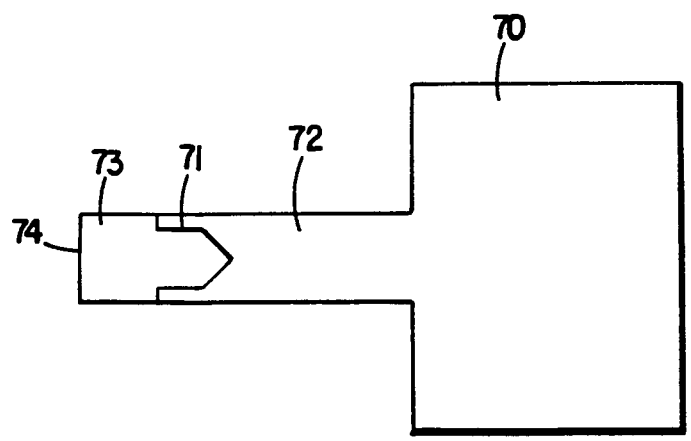
FIG. 7 is a sectional side view schematically illustrating another embodiment of the invention using an insert of optically absorbent polymer as the terminating means.

In a second embodiment of the invention the internal terminating fiber and ferrule are eliminated. This embodiment is shown schematically in FIG. 7 as it might be configured to mate with a connector of the type shown in FIG. 2. The terminator body 70 is one piece, comprised of a large supporting end and a ferrule-shaped extension 72. A mechanical means not shown can be provided to hold the terminator body and the port connector together. Functionally, the terminator body 70 serves primarily as a means of holding a soft polymer insert 74 in contact with the port fiber end to be terminated. To this end, in the mechanical arrangement illustrated in FIG. 7, a small recess 71 is formed in the end of ferrule-shaped extension of the terminator. An insert of soft polymer 73 is placed, e.g., by casting or adhesive means, in the recess 71 forming a soft polymer tip. Optically this soft polymer is chosen to have index of refraction within about 1% of the index of the core of the fiber to be terminated. The ferrule-shaped extension 72 and the polymer tip 73 are sized, in this example, to fit snugly into a standard female mating sleeve which also holds the fiber to be terminated, see FIG. 2.

When a terminator of this embodiment is inserted into the alignment sleeve 28 of FIG. 2, the face 74 of the soft polymer tip contacts the end 26 of the port fiber to be terminated. Because the polymer is soft, it deforms to match the contour of the port fiber end. Therefore, the polymer insert will make optical contact with port fibers shaped in any of the forms shown in FIG. 6. When the face surface 74 of the polymer contacts the fiber surface, optical power is conducted into the polymer material with very low back-reflection. The polymer material is made to have a relatively high optical absorption so that the light conducted into the polymer is rapidly attenuated.

Advantageously this embodiment of the terminator requires no internal fiber, ferrule, or cleaved fiber end termination. The entire structure can be made using high-speed molding techniques. In addition to the great savings in manufacturing cost these simplifications entail, the compliant polymer need not have the highly precise mechanical tolerances required of terminators of the first embodiment. Further, the compliant polymer forms an essentially air-tight seal over the end of the port fiber effectively sealing out moisture and airborne contaminant vapors that might attack and degrade the delicate optical surface of a properly prepared port fiber. Finally, because of the very low cost of the terminator in this form, it is an expendable item.

Figure 8:
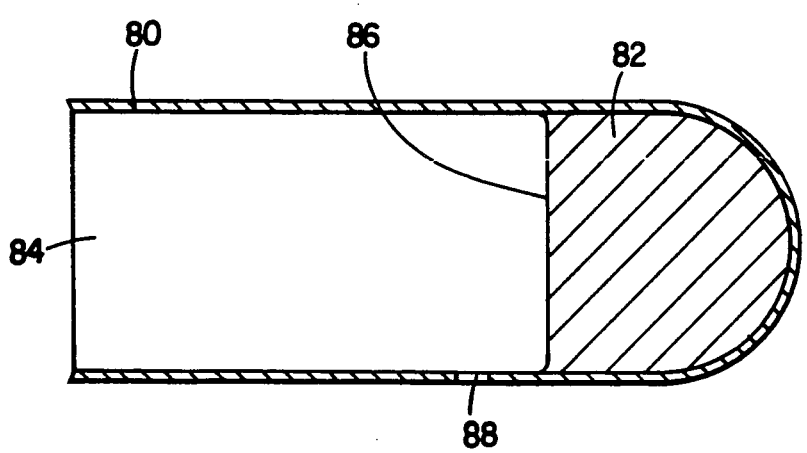
FIG. 8 is a sectional side view of another embodiment employing a compliant polymer cap for a connector ferrule, the bore of the cap ended with light-absorbing polymer.

An alternative variation of the second embodiment is made using a small compliant polymer cap into which a small amount of appropriate terminating polymer is injected to provide an end-wise directed face of the light absorbing polymer. As shown in the cross-sectional view of FIG. 8, a polymer cap 80, typical of the preformed caps used to protect the exposed ferrules of many commercially available connectors, is partially filled with a castable terminating polymer material 82 like that described in connection with FIG. 7, to provide end-wise directed face 86. The bore of the open end of the terminating cap 84 is shaped to fit snugly over the port connector ferrule of the fiber, e.g., the ferrule 27 in FIG. 2. The terminating cap is pressed end-wise over the port connector ferrule until the face 86 of the terminating polymer 82 makes contact with the port connector fiber end 26. A vent hole 88 is provided to allow trapped air to escape when the cap is pressed into place. When the terminating polymer contacts the optical fiber end, very low back-reflection termination is achieved.

What is claimed is:

1. A terminator for use with an optical fiber access port structure, said access port structure supporting an optical fiber having an optical end face exposed for the purpose of communicating with a like end face of another fiber, said terminator comprising;
   a. A supporting body providing means to removably interfit said terminator with said access port structure;
   b. A means contained within said supporting body for transferring optical power from said access port exposed optical face to a light absorbing means;
   c. A light absorbing means contained within said supporting body said light absorbing means effectively terminating said means of transferring optical power in manner to absorb incident light from said fiber end face and prevent back-reflection;

wherein optical power is conducted from said access port exposed optical face, through said means of transferring optical power, to said means of absorbing said optical power.

2. A fiber optic connector terminator as in claim 1 comprising a mechanical housing and a short length of optical fiber enclosed entirely within said mechanical housing, wherein said short length of fiber extends from an input end to a terminated end within said housing, said input end exposed in light receiving relationship with another fiber, said terminated end being terminated in a manner having essentially no reflectivity for optical energy traveling from said input end toward said terminated end within said short length of optical fiber, said mechanical housing constructed to removably mate with a fiber optic connector for the purpose of eliminating back-reflection and preventing escape of light energy from an optical fiber associated with said connector.

3. The fiber optic connector terminator of claim 2 wherein said short length of optical fiber is of the order of 1 centimeter or less in length.

4. A terminator for use with an optical fiber access port structure, said access port structure supporting an optical fiber having an optical end face exposed for the purpose of communicating with a like end face of another fiber, said terminator comprising;
 a. a mechanical body formed to removably place and hold a soft, optically absorbent polymer in contact with said port fiber end face;
 b. an optically absorbent polymer having index of refraction chosen to minimize back reflection from the interface between said end face of said port fiber and said polymer;
 wherein light is conducted from said end face of said port fiber directly into said absorbent polymer and therein is dissipated by optical absorption preventing back-reflection of optical power from said end face of said port fiber.

5. The terminator of claim 4 wherein said access port with which said terminator is to interfit is comprised of an end ferrule surrounding said optical fiber, and said terminator comprises a protective member having a bore constructed to slide endwise over said ferrule in interfitting relationship, and deformable light-absorbing material closing the end of said bore, the light-absorbing material having a face exposed to deformably engage the end of said fiber to absorb incident light and prevent back-reflection.

6. The fiber optic connector terminator as in claim 5 wherein said input end of said short length of optical fiber is flat polished, for mating with the end of an optical fiber of like construction.

7. A fiber optic connector terminator as in claim 5 wherein said input end is angle polished, for mating with the end of an optical fiber of like construction.

8. A fiber optic connector terminator as in claim 5 wherein said input end is convex polished, for mating with the end of an optical fiber of like construction.

9. A fiber optic connector terminator as in claim 5 wherein said input end abuts an optical elastomer mating material.

10. A fiber optic connector terminator as in claim 1 or 5 wherein said terminated end is formed as a result of cleaving said short fiber with a tool edge at an angle less than 90 angular degrees relative to the longitudinal axis of said short fiber and, after cleaving, said terminated end is coated with an optical power absorbing material.

11. A fiber optic connector terminator as in claim 4 wherein said body comprises a soft polymer cap sized to fit snugly over a ferrule of the port fiber wherein an end of the bore of said cap comprises optically absorbent polymer.

12. The fiber optic connector terminator of claim 11 wherein said cap is defined by a member having a cylindrical bore, and said polymer is present as a mass partially filling the length of said bore.

13. The fiber optic connector terminator of claim 12 wherein the interior of said bore has a coating applied prior to insertion of said polymer.

14. The fiber optic connector terminator as in claim 9 wherein said cap is provided with a vent hole.

* * * * *